US012680516B2

(12) United States Patent
Langness et al.

(10) Patent No.: US 12,680,516 B2
(45) Date of Patent: Jul. 14, 2026

(54) SENSOR SYSTEM AND METHOD

(71) Applicant: Transportation IP Holdings, LLC, Norwalk, CT (US)

(72) Inventors: Chenaniah Langness, Erie, PA (US); Matthew Heid, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 512 days.

(21) Appl. No.: 17/570,114

(22) Filed: Jan. 6, 2022

(65) Prior Publication Data

US 2023/0212993 A1 Jul. 6, 2023

(51) Int. Cl.
| | |
|---|---|
| *F02D 41/00* | (2006.01) |
| *F02D 41/14* | (2006.01) |
| *F02M 26/45* | (2016.01) |
| *G05B 13/02* | (2006.01) |
| *G05B 13/04* | (2006.01) |

(52) U.S. Cl.
CPC ..... *F02D 41/0052* (2013.01); *F02D 41/0055* (2013.01); *F02D 41/0065* (2013.01); *F02D 41/0077* (2013.01); *F02M 26/45* (2016.02); *F02D 2041/0075* (2013.01); *F02D 2041/1433* (2013.01); *G05B 13/027* (2013.01); *G05B 13/042* (2013.01)

(58) Field of Classification Search
CPC .... F02M 26/45; F02M 26/47; F02D 41/0052; F02D 41/0055; F02D 41/0065; F02D 41/0077; F02D 2041/0075; F02D 2041/1433; G05B 13/027; G05B 13/042; G06F 30/27; G01D 21/02
See application file for complete search history.

(56) References Cited

U.S. PATENT DOCUMENTS

| | | | | |
|---|---|---|---|---|
| 4,800,497 A | * | 1/1989 | Koori | B60W 10/06 |
| | | | | 701/67 |
| 6,715,287 B1 | * | 4/2004 | Engel | F02D 41/0072 |
| | | | | 60/601 |

(Continued)

FOREIGN PATENT DOCUMENTS

| | | | | |
|---|---|---|---|---|
| AU | 2015249207 A1 | 11/2015 | | |
| DE | 102013210678 A1 | * 12/2014 | | F02D 21/08 |

(Continued)

OTHER PUBLICATIONS

Search Report mailed Mar. 16, 2023 for corresponding Eurasian Patent Application No. 202293495. English translation provided. (5 pages).

(Continued)

*Primary Examiner* — John M Zaleskas
(74) *Attorney, Agent, or Firm* — K&L Gates LLP

(57) ABSTRACT

A system may include virtual sensors representative of operation of different portions of a tangible system. The virtual sensors may receive measured characteristics of the tangible system and may separately output values representative of operation of a common component of the tangible system based on the one or more measured characteristics input into each virtual sensor. A controller may receive the output values from the virtual sensors and determine a state of the common component by comparing the first output value with the second output value.

17 Claims, 2 Drawing Sheets

(56) References Cited

U.S. PATENT DOCUMENTS

| | | | | |
|---|---|---|---|---|
| 7,000,600 | B1 * | 2/2006 | Yamada | F02D 41/40 |
| | | | | 123/494 |
| 10,156,175 | B1 * | 12/2018 | Hattar | F01N 9/002 |
| 10,794,304 | B2 | 10/2020 | Henry et al. | |
| 2004/0089061 | A1 * | 5/2004 | Matsunaga | F02D 41/0072 |
| | | | | 73/114.76 |
| 2006/0184308 | A1 * | 8/2006 | Hasegawa | F02D 41/222 |
| | | | | 701/114 |
| 2006/0184309 | A1 * | 8/2006 | Hasegawa | G01L 27/007 |
| | | | | 701/114 |
| 2006/0200301 | A1 * | 9/2006 | Hasegawa | F02D 41/222 |
| | | | | 701/114 |
| 2006/0212281 | A1 * | 9/2006 | Mathews | G06F 30/15 |
| | | | | 703/7 |
| 2007/0012040 | A1 * | 1/2007 | Nitzke | F02D 41/145 |
| | | | | 60/605.2 |
| 2007/0277778 | A1 * | 12/2007 | Eser | F02D 41/145 |
| | | | | 123/321 |
| 2008/0201054 | A1 * | 8/2008 | Grichnik | F02D 41/1401 |
| | | | | 703/2 |
| 2009/0000322 | A1 * | 1/2009 | Hatakeyama | B60H 1/3208 |
| | | | | 62/227 |
| 2009/0125217 | A1 * | 5/2009 | Nam | F02M 26/35 |
| | | | | 60/611 |
| 2012/0023932 | A1 * | 2/2012 | Ge | F02D 41/145 |
| | | | | 60/602 |
| 2012/0304640 | A1 * | 12/2012 | Tsuyuki | F02D 41/0077 |
| | | | | 60/605.2 |
| 2013/0013138 | A1 | 1/2013 | Lu et al. | |
| 2013/0042843 | A1 * | 2/2013 | Sano | F02D 41/0072 |
| | | | | 123/568.21 |
| 2013/0230413 | A1 * | 9/2013 | Yamaji | F04B 17/05 |
| | | | | 417/53 |
| 2014/0230530 | A1 * | 8/2014 | Fontvieille | F02D 41/221 |
| | | | | 73/114.13 |
| 2014/0372011 | A1 * | 12/2014 | Kim | F02D 41/0072 |
| | | | | 701/108 |
| 2015/0128916 | A1 * | 5/2015 | Surnilla | F02D 41/144 |
| | | | | 123/568.12 |
| 2016/0084181 | A1 * | 3/2016 | Henry | F02M 26/47 |
| | | | | 123/568.21 |
| 2016/0131057 | A1 * | 5/2016 | Lahti | F02M 26/22 |
| | | | | 701/103 |
| 2016/0222891 | A1 * | 8/2016 | Zeng | F02D 35/0053 |
| 2016/0258371 | A1 * | 9/2016 | Makled | F02D 41/1402 |
| 2017/0009709 | A1 * | 1/2017 | Cloos | F02D 41/0077 |
| 2018/0195470 | A1 * | 7/2018 | Bevan | B60H 1/00978 |
| 2018/0223753 | A1 * | 8/2018 | Henry | F02M 26/43 |
| 2018/0274499 | A1 * | 9/2018 | Ueno | F02D 41/1448 |
| 2019/0032590 | A1 * | 1/2019 | Conis | F02D 41/0077 |
| 2019/0042960 | A1 | 2/2019 | Lindner | |
| 2019/0128196 | A1 * | 5/2019 | Wang | F02M 26/28 |
| 2019/0128197 | A1 * | 5/2019 | Wang | F02M 26/47 |
| 2020/0072143 | A1 | 3/2020 | Mischler et al. | |
| 2020/0182206 | A1 * | 6/2020 | Oh | F02M 26/33 |
| 2021/0003088 | A1 * | 1/2021 | Chen | F02B 5/02 |
| 2021/0270178 | A1 * | 9/2021 | Becker | F01N 11/00 |
| 2022/0372937 | A1 * | 11/2022 | Jentz | F02M 26/48 |

FOREIGN PATENT DOCUMENTS

| | | | | | |
|---|---|---|---|---|---|
| EP | | 3075977 | A1 * | 10/2016 | F01N 3/2066 |
| JP | | 2003161200 | A * | 6/2003 | F02D 41/2451 |
| JP | | 2007016683 | A * | 1/2007 | |
| JP | | 2009167836 | A * | 7/2009 | |
| JP | | 2016075304 | A * | 5/2016 | |
| JP | | 2020158002 | A * | 10/2020 | |
| JP | | 2021080888 | A * | 5/2021 | |
| WO | WO-2013120772 | | A1 * | 8/2013 | F02B 37/12 |
| WO | WO-2020108565 | | A1 * | 6/2020 | F02M 26/47 |

OTHER PUBLICATIONS

Office Action mailed Mar. 17, 2023 for corresponding Eurasian Patent Application No. 202293495. English translation provided. (7 pages).

Office Action mailed Jun. 9, 2023 for corresponding Eurasian Patent Application No. 202293495 (5 pages).

* cited by examiner

SENSOR SYSTEM AND METHOD

BACKGROUND

Technical Field

The subject matter described herein relates to systems and methods that indirectly determine characteristics of a system where the characteristics are not directly measured.

Discussion of Art

Sensors are provided to measure a variety of characteristics in systems. For example, sensors may measure temperatures, humidity, pressure, light, etc., in a variety of environments. These sensors may directly measure these characteristics, such as by being placed in the locations where the characteristics are to be measured, by being positioned such that the sensors have a line of sight to the location where the characteristics are being measured, and so on. Some systems, however, may not permit sensors to be positioned in the locations where the sensors may measure characteristics. For example, in some sealed systems or sealed components of systems, a sensor or may not be able to be inserted into the sealed areas, the sensors may not be able to have a line of sight into the sealed areas, or it may be time- and/or cost-intensive to dismantle the system to place the sensors in the sealed area. As a result, characteristics of the system in these locations may not be able to be measured by the sensors.

As one example of such a system having an area where sensors may not be positioned, some internal combustion engines have exhaust gas recirculation (EGR) systems. The EGR systems recirculate at least a portion of engine exhaust gas back to engine cylinders. The EGR systems may have a metering valve in an upstream location (along the direction in which the engine exhaust flows through the EGR systems to the engine cylinders) that controls the flow of engine exhaust into and through the EGR systems. The exhaust may flow from the metering valve; through conduits, manifolds, or the like (e.g., one or more filters); and then into a cooler of the EGR system that reduces the temperature of the exhaust. While sensors (e.g., that measure temperature, pressure, exhaust flow, etc.) may be positioned upstream of the metering valve and/or downstream of the cooler, the sensors may not be able to be positioned in one or more locations between the metering valve and the cooler. This may be due to one or more of these locations being sealed, being time-consuming or expensive to access and re-assemble, or the like.

Measuring the temperatures, pressures, exhaust flow, etc. upstream of the metering valve and downstream of the cooler may provide some information on operation of the EGR. For example, measuring these characteristics may indicate that one or more components of the EGR are clogged with debris or carbon buildup, or are otherwise performing in an undesirable way. But some known systems and methods may not be able to use the characteristics measured upstream of the metering valve and downstream of the cooler to pinpoint which location or component of the EGR is performing in an undesirable way. Having the ability to sense the characteristics in other locations that are currently inaccessible would be helpful to pinpoint which areas or components are operating in an undesirable way.

It may be desirable to have a system and method that differs from those that are currently available.

BRIEF DESCRIPTION

In one example, a method is provided that may include obtaining first and second mathematical models representative of operations of respective first and second portions of a tangible system. Each of the first mathematical model and the second mathematical model may output a respective first or second output value representative of operation of a common component of the tangible system that may be included in both the first and second portions of the tangible system. The method also may include inputting at least a first input value of at least a first measured characteristic of the first portion of the tangible system into the first mathematical model and at least a second input value of a second measured characteristic of the second portion of the tangible system into the second mathematical model. The method also may include obtaining the first output value from the first mathematical model based on the at least the first input value and the second output value from the second mathematical model based on the at least the second input value. The method may include determining a state of the common component by comparing the first output value from the first mathematical model with the second output value from the second mathematical model.

In another example, a system is provided that may include a first virtual sensor representative of operation of a first portion of a tangible system. The first virtual sensor may receive one or more first measured characteristics of the tangible system and may output a first output value representative of operation of a common component of the tangible system based on the one or more first measured characteristics. The system may include a second virtual sensor representative of operation of a second portion of the tangible system. The second virtual sensor may receive one or more second measured characteristics of the tangible system and may output a second output value representative of operation of the common component of the tangible system based on the one or more second measured characteristics. The common component of the tangible system may be included in both the first and second portions of the tangible system. The system also may include a controller that may receive the first output value from the first virtual sensor and the second output value from the second virtual sensor. The controller may determine a state of the common component by comparing the first output value with the second output value.

In another example, a system may include a first pressure sensor that may measure a first pressure upstream of a gas cooling apparatus in an EGR system of a vehicle, a position sensor that may detect a position of a valve that is upstream of the gas cooling apparatus, a second pressure sensor that may measure a second pressure downstream of the gas cooling apparatus, and a controller that may calculate a first calculated value based on a combination of the first pressure, the position of the valve, and a flow rate of exhaust through the valve. The controller may calculate a second calculated value based on the second pressure and an efficiency value of the gas cooling apparatus. The controller may determine a state of the EGR system by comparing the first calculated value and the second calculated value.

BRIEF DESCRIPTION OF THE DRAWINGS

The subject matter may be understood from reading the following description of non-limiting embodiments, with reference to the attached drawings, wherein below.

DETAILED DESCRIPTION

Figure 1:
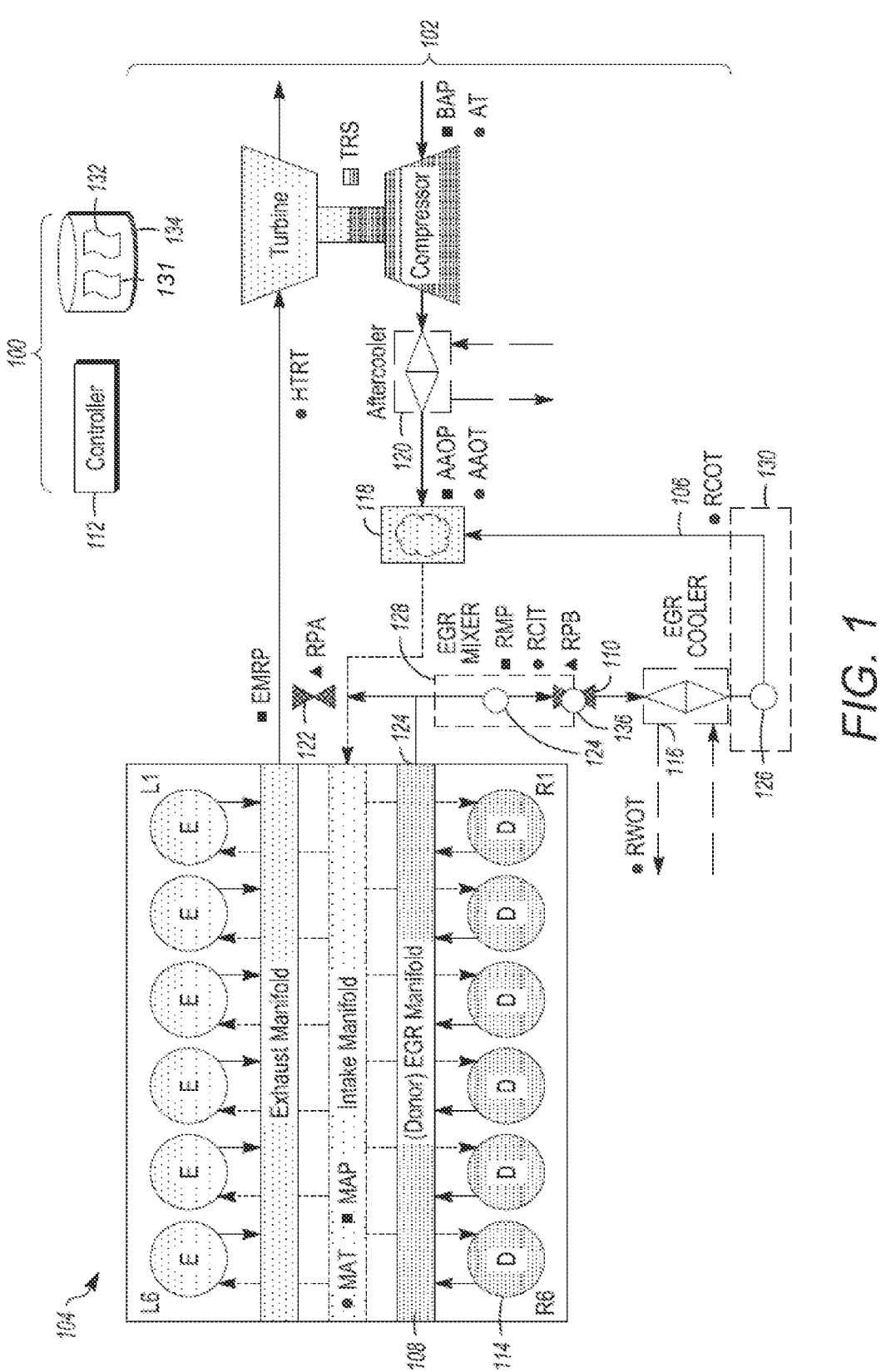
FIG. 1 shows an exemplary embodiment of a sensor system that may be used to monitor a state of operation of a tangible system.

Embodiments of the subject matter described herein relate to sensor systems and methods that can make use of multiple sources of data along with physics-based models to develop and train a virtual model of a system. The sources of data may be, for example, relating to material usage, incident driven data, a continuous engine recorder, and the like. Suitable physics-based models may include the pressures between valves. In one embodiment, the pressure differential may be between an metering valve and a heat exchanger. A suitable metering valve may be an EGR metering valve, just referred to as an EGR valve. A suitable heat exchanger may be an EGR cooler, which also can be referred to as a cooling apparatus.

The sensor systems and methods described herein may provide a virtual sensor at a location that a physical (e.g., tangible) sensor may not be able to be positioned, or where placing the sensor at that location may take significant time or cost expenditures. In one embodiment, the virtual sensor may provide outputs that allow failure modes of the overall system to be determined or may help in the diagnosis or prognosis of operating conditions of a system.

The sensor systems and methods may use mathematical models that represent operation of different portions, regions, or segments of a tangible system. In the illustrated embodiment, the tangible system will be discussed and described as an EGR system that is disposed in a vehicle. Each of the models may output (e.g., be used by one or more processors to calculate) a respective upstream or second output value. These output values represent operation of a common component of the tangible system that may be included in both the upstream and second portions of the tangible system. For example, one portion of the tangible system may include and extend from an inlet into a metering valve (referred to as an EGR valve) of the EGR system to a location in a conduit between the metering valve and the EGR cooler. The other portion of the tangible system may include and extend from the same location in the conduit between the metering valve and the EGR cooler to an output of the EGR cooler. The location in the conduit between the metering valve and the EGR cooler may not have any sensor (e.g., no pressure sensor) in this conduit that measures pressure of exhaust (or another characteristic, such as temperature).

One or more tangible sensors may measure characteristics of the EGR system in different locations as input values, with the input values then provided to mathematical models as values of variables of the models to calculate other characteristics of the EGR system. One model may be referred to as an upstream model and another model may be referred to as a downstream model. The upstream model represents operation of the system in one or more upstream locations or areas that are ahead of one or more downstream locations or areas along a direction in which a fluid (e.g., a gas) flows through the system. A first upstream input value may be a first pressure may be measured in an upstream location that may be upstream of the cooler device.

This upstream location may be accessible to tangible sensors, such as in a location that may be at or upstream of a metering valve ahead of an EGR cooler device (e.g., along a direction in which exhaust flows toward the cooler device). A second upstream input value may be a position or state of the metering valve. This second upstream input value may be detected by another tangible sensor or provided by the metering valve (e.g., as an output from the metering valve). A third upstream input value may be a rate of exhaust flow through the metering valve. This third upstream input value may be measured (or determined, such as from the position of the metering valve) by another tangible sensor.

The measured upstream pressure, valve position, and/or exhaust flow through the metering valve may be upstream input values that are input into an upstream mathematical model as values of variables to calculate (e.g., using the upstream model) another pressure in or at the location that may be inaccessible to tangible sensors (e.g., the location that may be between the metering valve and the cooler device). This pressure may be referred to as an upstream calculated characteristic or an upstream modeled pressure.

A downstream pressure may be measured in a downstream location that may be downstream of the cooler device of the EGR system. Additionally or alternatively, an efficiency value of the EGR cooler device may be determined. The efficiency value may be a user-input value, or may be calculated based on the age of the cooler device, the amount of temperature of the exhaust between the metering value and downstream of the cooler device, etc. The measured downstream pressure and/or efficiency value, the valve position, and/or exhaust flow through the metering valve may be downstream input values that are input into a downstream mathematical model as values of variables to calculate (e.g., using the downstream model) another pressure in or at the location that may be inaccessible to tangible sensors (e.g., the location that may be between the metering valve and the cooler device). This pressure may be referred to as a downstream calculated characteristic or a downstream modeled pressure.

Each of the upstream and downstream models may have a variable that may be independent of the other model. For example, the value of a variable output of the upstream model may not change when the input value to the downstream model changes, and the value of a variable output of the downstream model may not change when the input value to the upstream model changes.

The two outputs from the different upstream and downstream mathematical models (e.g., the pressures calculated in the location between the metering valve and the cooler device) may then be compared to determine a state or condition of the EGR system components in or near this same location, such as the state or condition of the EGR cooler device, as described herein. The sensor system and method may then change operation of one or more of the upstream portion of the tangible system, the downstream portion of the tangible system, or the common component based on the state of the common component that may be determined.

The component models may represent known or measured dynamics of healthy valves that are functioning as expected. Suitable models may be linear models of EGR cooler fouling trends. The component models to build an operating model that relies, at least in part, on operating conditions of the engine, age of the EGR cooler, and the type of EGR metering valve. To build an operating model of an expected pressure drop across the metering valve, pressure drops across valves that are known to be operating as expected (e.g., are healthy) are measured and then applied to a subpopulation of systems to allow for an operating model of pressure drop across the EGR cooler to be developed from the modelled pressures of healthy valves. The models developed from healthy valves and a normally fouling EGR cooler then provide an independent virtual pressure sensor between the EGR metering valve and the EGR cooler. One model (e.g., an upstream model) can represent operation of the EGR system in an upstream location (e.g., upstream of the EGR cooler) and another model (e.g., a downstream model) can represent operation of the EGR system in a downstream location (e.g., downstream from the EGR cooler). As a ratio of outputs from the upstream and downstream models changes, this change indicates whether the model of the pressure drop across the cooler may be not properly predicting the pressure drop or whether the pressure drop across the upstream model of the valve may be shifting. This allows failures to be diagnosed between the EGR metering valve and the EGR cooler.

The state of the common component may be determined to be a non-idealized state or unhealthy state when a ratio of the values output by the upstream and downstream models exceeds a designated threshold (or, in another embodiment, may be no more than the designated threshold). The state of the common component may be determined to be an idealized state responsive to the ratio not exceeding the designated threshold (or, in the other embodiment, exceeds the designated threshold).

Alternative methods of determining failure modes and lead time include using fault data and incidents to identify if there may be a problem with the system (e.g., the EGR metering valve or cooler) and working through troubleshooting steps to determine what component has failed. Often, an expert in the system could use the data that would be used in the model to make a good assumption of the failed component, but that may be after the failure. Alternative types of models could be developed using classification of the input signals with known labeled failures to build a classification model, but may lack the predictive capability that the systems and methods described herein provide.

To develop the upstream and downstream models (which may be referred to as virtual models) between the EGR metering valve and the EGR cooler, data may be collected for healthy valves and coolers for the different types of valves and coolers. This data may be measured pressure drops. Current configurations include two generations of valves and two different cooler suppliers, so four different sets of data may be collected. Some types of failure modes may only be present on one generation of the valve, and others only occur after age, so the age of the parts may be observed and taken into account in the models. Once this training data may be identified, the models may be trained by inputting a measured pressure drop across the metering valve into one model and calculating the output from the model. Another model of EGR cooler fouling may be developed using at operational data (e.g., least a year's worth of data) of EGR cooler operational data. The models may be combined to determine whether there are different failure modes between the two.

Developing and applying this sensor system and method may allow for a predictive model that will identify different failure modes of the EGR metering valve. This will allow for road failures to be prevented, as well as decreasing extra part usage (e.g., by avoiding replacing the valves that are not faulty).

FIG. 1 shows an example embodiment of a sensor system 100 that may be used to monitor a state of operation of a tangible system 102. The tangible system may represent at least part of a propulsion system of a vehicle. For example, the tangible system may represent an EGR system of a vehicle that recirculates at least some exhaust from an engine 104 of the vehicle back into the engine. Optionally, the engine shown in FIG. 1 may represent all or part of a propulsion system of a vehicle. The EGR system includes several conduits 106 that fluidly couple an outlet or exhaust manifold 108 of the engine with a metering valve 110. The metering valve opens or closes to varying degrees under control of a controller 112 to control the rate at which exhaust from cylinders 114 of the engine flows out of the exhaust manifold and into a gas cooling apparatus, or EGR cooler device, 116 via the conduits. The EGR cooler may reduce a temperature of the exhaust flowing through and out of the EGR cooler into an EGR mixer device 118. This mixer device may mix the exhaust output from the EGR cooler with additional air received from an aftercooler device 120. The mixture of exhaust and air may be directed back into one or more cylinders of the engine via an EGR bypass valve 122. The bypass valve may be controlled by the controller to change positions and change the rate of the mixture flowing into the cylinders.

The controller may represent hardware circuitry that includes and/or may be connected with one or more processors (e.g., microprocessors, field programmable gate arrays, integrated circuits, etc.) that perform the functions described herein in connection with the controller. The sensor system may include multiple tangible sensors, such as an upstream pressure sensor 124 disposed in or along the conduits upstream of the metering valve and downstream from the engine and exhaust manifold, a second pressure sensor 126 disposed in or along the conduits downstream of the EGR cooler and upstream from the EGR mixer device and the engine, and a valve sensor 136 at or near the metering valve. This valve sensor may measure positions of the valve, such as 0% open (e.g., blocking all exhaust flow through the valve), 50% open (e.g., allowing half of the exhaust flow through the valve), 100% open (e.g., allowing all exhaust flow through the valve), or the like. Optionally, the valve sensor may measure the flow of exhaust through the valve. Alternatively, the sensor 136 may represent multiple sensors, such as a first sensor that measures the position of the valve and a second sensor that measures the rate at which exhaust flows into or through the metering valve.

In one embodiment, the controller may have a local data collection system deployed that may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the controller may include a policy engine that may apply one or more policies. These policies may be based at least in part on characteristics of a given item of equipment or environment. With respect to control policies, a neural network may receive input of a number of environmental and task-related parameters. These parameters may include an identification of a determined trip plan for a vehicle group, data from various sensors, and location and/or position data. The neural network may be trained to generate an output based on these inputs, with the output representing an action or sequence of actions that the vehicle group should take to accomplish the trip plan. During operation of one embodiment, a determination may occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model may be selected, and the vehicle controller executes that plan to achieve the desired input data to mirror the predicted best outcome scenario. Additionally, the success metric may be a combination of the optimized outcomes, which may be weighed relative to each other.

The tangible system may be logically divided into different portions, such as an upstream portion 128 comprising the metering valve and a second portion 130 comprising the EGR cooler. For example, the upstream portion may include at least part of the conduits extending from the exhaust manifold to the metering valve and the metering valve, and the second portion may include one or more of the conduits extending from the EGR cooler to the EGR mixer and, optionally, the EGR cooler. The locations or areas between these portions may not include any sensors or may not be easily adaptable to add sensors (e.g., without dismantling at least part of the EGR system).

Although the tangible system discussed herein is an EGR system, other tangible systems in other embodiments may have a first portion with certain measurable physical properties or characteristics, a second portion having certain measurable physical properties or characteristics, and an intermediate component or area shared between the first portion and the second portion such that the physical behavior of the first and second portions and affect the common component. The common component may be a physical component that may be a part of the tangible system, such as an exhaust gas valve in an internal combustion engine.

Figure 2:
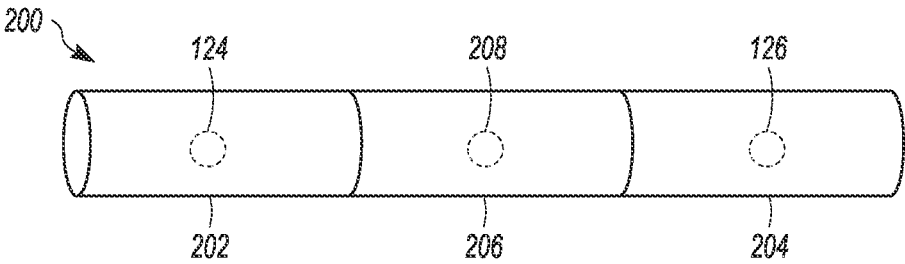
FIG. 2 schematically illustrates a tangible system and upstream and downstream portions of the tangible system.

FIG. 2 schematically illustrates a tangible system 200 and upstream and second portions 202, 204 of the tangible system. The tangible system shown in FIG. 2 is at least part of the EGR system. The upstream portion shown in FIG. 2 represents the upstream portion of the EGR system shown in FIG. 1, and the second portion shown in FIG. 2 represents the second portion of the EGR system shown in FIG. 1. An intermediate portion 206 of the tangible system shown in FIG. 2 represents the parts of the EGR system extending downstream from the metering valve and extending upstream from an outlet of the EGR cooler. Alternatively, the different portions can represent different segments of another type of system, where sensors may be placed within the upstream and second portions, but not within the intermediate portion.

Operation of the upstream, second, and intermediate portions of the tangible system may depend on each other. For example, a fluid (e.g., exhaust gas, air, liquid, etc.) may flow through the upstream portion, then the intermediate portion, and then the second portion. If the temperature, pressure, flow rate, chemical makeup, or the like, of the fluid in the upstream portion changes, then this change may impact the same or different characteristic (e.g., temperature, pressure, flow rate, chemical makeup, or the like) of the fluid in the intermediate portion and/or the second portion. This changing characteristic may reflect operation of one or more components of the intermediate portion. But because a sensor may not be positioned in the intermediate portion, the characteristic of the fluid within the intermediate portion may not be known or measured. The sensor systems and methods described herein may use models that correlate or relate characteristics measured in or around the upstream and second portions by a tangible sensor with a characteristic of the intermediate portion.

For example, an upstream virtual sensor may be represented and/or embodied in an upstream mathematical model 131 (shown in FIG. 1) that may be used by the controller to calculate one or more output values. A second virtual sensor may be represented and/or embodiment in a different, second mathematical model 132 (shown in FIG. 1) that may be used by the controller to calculate one or more output values. These models may be stored in a tangible and non-transitory computer readable medium 134 (shown in FIG. 1), such as a computer hard drive, server, removable disc, or the like. The controller can input one or more values (e.g., input values) into each model and use each model to calculate one or more output values. The input values may be provided by one or more actual, tangible sensors, such as the sensors 124, 126, 136, as described above.

The upstream model may receive a pressure measured at or upstream of the metering valve (e.g., by the upstream pressure sensor 124), a state or position of the metering valve (e.g., as output by the valve or measured by the valve sensor 136), and/or a flow of exhaust into or through the metering valve (e.g., as measured by the upstream pressure sensor, or based on the position of the valve by the valve sensor) as input values. The downstream model may receive the pressure measured downstream of the EGR cooler device and/or the efficiency of the cooler device as input values. Each model may be used (e.g., by the controller) to calculate the same or different calculated pressures using the different input values. The calculated pressures may then be compared to determine the state or condition of one or more components of the EGR system, such as the EGR cooler.

For example, the output values of the models may represent operation or a state of the same location or component in the tangible system. The output of the upstream model may represent a pressure or pressure drop calculated to exist in an area or location 206 within the intermediate region or portion. This pressure or pressure drop may be calculated using the upstream model and the corresponding input values. The output of the downstream model may represent a pressure or pressure drop calculated to exist in the same area or location within the intermediate region or portion. This pressure or pressure drop may be calculated using the downstream model and the corresponding input values. The state of one or more components within the intermediate region may be determined based on these output values. For example, as the output values converge (e.g., the output values are closer together or the same), the state of the component(s) within the intermediate portion may be determined to be a first state (e.g., a healthy state or state where the components are operating as expected). Conversely, as the output values diverge (e.g., the output values are farther apart or the difference between the values increase), the state of the component(s) within the intermediate portion may be determined to be a different, second state (e.g., an unhealthy state or state where the components are not operating as expected).

For example, an upstream virtual sensor may be an upstream mathematical model that receives a pressure measured upstream or at the metering valve (or in another location upstream of the cooler device), a state or position of the metering valve, and/or the flow rate of exhaust through or into the metering valve. The controller may input these measurements into the upstream virtual sensor to output the first output value as an upstream modeled value of a pressure at a common component 208 in the intermediate region or portion of the tangible system. For example, the upstream virtual sensor may be configured to output the first output value as a pressure or pressure drop in the intermediate region or portion, or another location in an internal combustion engine exhaust gas recovery system. The upstream mathematical model of the upstream virtual sensor has at least one variable that may be independent of another of the downstream mathematical model, such as the pressure measured at or upstream of the metering valve, the position of the metering valve, and/or the rate of exhaust flow.

The controller may receive a downstream measured pressure or pressure drop from the downstream tangible pressure sensor and/or the efficiency of the cooler device, and input these values into the downstream mathematical model. The output value from the downstream model may represent the pressure or pressure drop in the intermediate region or portion, or another location in the internal combustion engine exhaust gas recovery system. Optionally, a third or one or more additional virtual sensors may be used to receive measured values or the output values of other models. The third virtual sensor may output a value indicative of the state of the common component within the intermediate region based on a comparison between the output values from two or more of the models (e.g., the upstream and downstream models).

The controller may receive the output values from the models and compare the output values by calculating a ratio of the values. The controller may then determine the state or condition of the intermediate portion of the tangible system (or a component within this portion) based on a ratio or difference between the output values. As the ratio increases in value above one or decreases in value below one, or as the difference between the output values increases above zero or decreases below zero, the controller may determine that the state or condition of the intermediate portion (or a component in this portion) of the tangible system may be deteriorating. Conversely, as the ratio moves toward a value of one or as the difference moves closer to zero, the controller may determine that the state or condition of the intermediate portion (or a component in this portion) of the tangible system may be closer to or at an expected condition or state.

The controller may operate as a third virtual sensor by detecting the state or condition of the intermediate portion of the tangible system without directly measuring a characteristic of the intermediate portion of the tangible system. For example, instead of having a tangible sensor disposed within the intermediate portion of the tangible system, the controller may indirectly sense or detect the state of the intermediate portion by comparing the output values from the mathematical models.

The controller may change operation of the tangible system based on the state that may be determined. For example, the controller may de-rate the engine, may deactivate or turn off the engine, may change a position of the metering valve (e.g., to prevent or reduce the exhaust that may be directed into the cooler device), may change a position of the bypass valve (e.g., to prevent or reduce the exhaust that may be directed into the cooler device), or the like, responsive to the ratio of the output values moving farther from a value of one or the difference between the output values moving farther from a value of zero. For example, responsive to the ratio increasing above a threshold value, the ratio decreasing below another threshold value, the difference increasing above another threshold value, and/or the difference decreasing below another threshold value, the controller may automatically implement one or more responsive actions to change operation of the tangible system.

Not all embodiments of the systems and methods described herein are limited to EGR systems or measuring pressures. One or more embodiments may be used to measure other characteristics, such as temperatures, vibrations, electrical parameters (e.g., voltages, currents, states of charge, etc.), or the like, with the characteristics input into different models and the outputs of the models compared with each other to evaluate a state or condition of the system. As one example, a first tangible sensor may measure a voltage, a voltage waveform, current, or the like, for an electric device (e.g., a motor, generator, alternator, or the like), and a second tangible sensor may measure a temperature, motor torque, vibration, or the like for the same electric device. These different measurements may be input into different models (as described herein) to calculate different output values, with the output values compared to evaluate or determine the state of the electric device.

Figure 3:
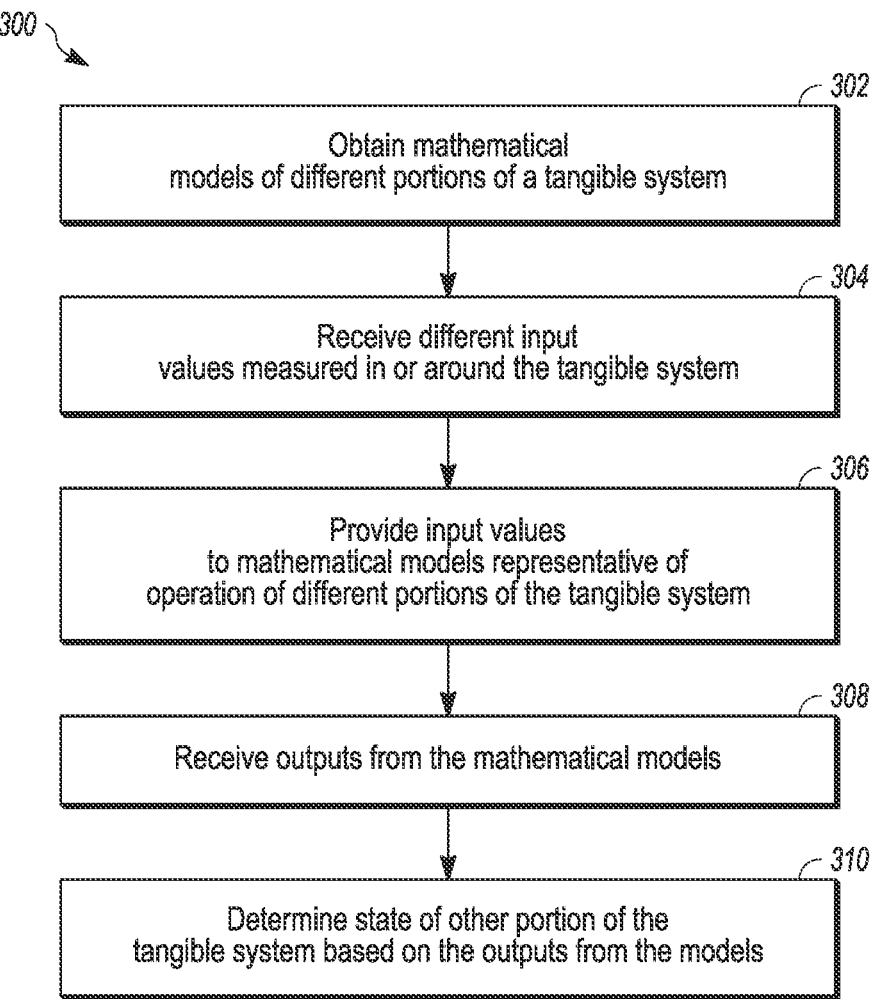
FIG. 3 illustrates a flowchart of one example of a method for monitoring operation of a tangible system.

FIG. 3 illustrates a flowchart of one example of a method 300 for monitoring operation of a tangible system. The flowchart of the method may represent operations performed by the sensor system described herein, such as the operations performed by the controller. At step 302, mathematical models of different portions of a tangible system are obtained. These models may differ from each other. For example, each of the models may rely on, depend, or receive a variable that may be independent or different from the other model(s). With respect to the example shown in FIG. 1, one model may be an upstream model that may receive a pressure measured by the sensor upstream from the metering valve as the variable for that upstream model, while another downstream model may receive a pressure measured by the sensor that may be downstream from the cooler device as the variable for that downstream model. The models may be obtained from a computer memory, and may be created from mathematical equations that relate to previously measured, empirical data or other information of the same or a similar tangible system.

At step 304, input values are received. These input values may be characteristics of the tangible system that are measured by one or more tangible sensors in or around the tangible system and/or that are input into the controller. In one example, the input values are measured and output by different tangible sensors located in different locations within or around the tangle system. In another example, the input values are measured and output by different sensors located in the same location within or around the tangle system. In another example, the input values are measured and output by the same sensor, but measured in different locations of the tangible system. The input values may be measured by tangible sensor(s), such as one or more sensors that may be held, moved, or otherwise handled (e.g., in contrast to a virtual sensor, which may be one or more mathematical equations, such as in a mathematical model).

At step 306, the input values (e.g., received at step 304) are provided to mathematical models. For example, the controller may input the input values into different mathematical models. As described above, these models may represent behavior or operation of different segments of the tangible system. The models may be different in that each model may depend on or otherwise be based on a different variable, such as one or more characteristics of the tangible system measured in different locations, by different sensors, or the like.

At step 308, outputs of the mathematical models are received. For example, the controller may calculate output values using each of the models into which an input value was provided (e.g., at step 306). The output values may be calculated using the models based on the input values that are input into the models. At step 310, a state of a portion of the tangible system may be determined based on the outputs from the models. The controller may compare the output values from the models to determine a state or condition of a portion or segment of the tangible system. This portion or segment of the tangible system may be different from the portions or segments of the tangible system in which the input values were measured. For example, the portion or segment for which the state or condition may be determined may be inaccessible to the tangible sensors (or may only be accessible after deconstructing or taking apart of the tangible system). The state or condition may be determined based on a ratio or difference between the output values, as described above. Responsive to determining the state or condition, the controller may implement one or more responsive actions, such as shutting down or deactivating the tangible system, changing a state of a valve, or the like, as described above.

For example, the state or condition that may be determined may indicate wear of one or more of the valves described herein, such as the wear of a spline that connects a butterfly plate to an actuator of the valve, wear of a bushing around a shaft of the valve, etc. This wear may cause the reported valve positions and actual valve positions to differ. The shift in relative positions between reported and actual may produce a difference detectable by the systems and methods described herein. In this latter case, the movement may could allow for oil to leak through from the actuator side to the butterfly plate side.

Using one or more embodiments of the invention, multiple sources of data (material usage, incident driven data, continuous engine recorder) along with physics-based models may be used to develop a virtual model of the pressure between and EGR metering valve and an EGR cooler. The resultant virtual pressure sensor at this location allows failure modes to be determined based on the expected position of the valve and the expected back pressure of the EGR cooler.

The virtual sensor may be built using known dynamics of healthy valves and through a linear model of the EGR cooler fouling to build a model that relies on operating conditions of the engine and age of the EGR cooler and EGR metering valve. To build a model of healthy pressure drop across the valve the EGR bypass valve may be used as a surrogate. It has pressure measurements on both sides of the valve. The model developed for healthy valves may be then applied to a subpopulation to allow for a model of pressure drop across the EGR cooler to be developed. These models then provide an independent virtual pressure sensor between the EGR metering valve and the EGR cooler. As the ratio of the two changes, it indicates if the EGR cooler model may be not properly predicting the pressure or if the pressure drop across the metering valve model may shifts. That may allow performance drops or failures to be diagnosed or anticipated as between the EGR metering valve and the EGR cooler.

Embodiments of the subject matter described herein may apply to a variety of physical systems having cooperating components around which one may build physics-based models thereby allowing one to use the systems and methods of the present invention to identify when the models diverge from their respective expected values and the physical cause of such divergence.

In one example, a method is provided that may include obtaining first and second mathematical models representative of operations of respective first and second portions of a tangible system. Each of the first mathematical model and the second mathematical model may output a respective first or second output value representative of operation of a common component of the tangible system that may be included in both the first and second portions of the tangible system. The method also may include inputting at least a first input value of at least a first measured characteristic of the first portion of the tangible system into the first mathematical model and at least a second input value of a second measured characteristic of the second portion of the tangible system into the second mathematical model. The method also may include obtaining the first output value from the first mathematical model based on the at least the first input value and the second output value from the second mathematical model based on the at least the second input value. The method may include determining a state of the common component by comparing the first output value from the first mathematical model with the second output value from the second mathematical model.

The method optionally also may include changing operation the first portion of the tangible system, the second portion of the tangible system, and/or the common component based on the state of the common component that is determined. Each of the first mathematical model and the second mathematical model may have a variable that is independent of another of the second mathematical model or the first mathematical model. The state of the common component may be determined to be a non-idealized state responsive to a ratio of the first output value and the second output value exceeding a designated threshold. The state of the common component may be determined to be an ideal- ized state responsive to the ratio of the first output value and the second output value not exceeding the designated threshold.

The first mathematical model may represent a first pressure drop across the first portion of the tangible system, and the second mathematical model may represent a second pressure drop across the second portion of the tangible system. The first mathematical model may output the first output value as a first modeled value of a pressure at the common component of the tangible system. The second mathematical model may output the second output value as a second modeled value of the pressure at the common component of the tangible system.

The tangible system may include a propulsion system of a vehicle, the first portion of the tangible system may include a metering valve, and the second portion of the tangible system may include a gas cooling device of the vehicle. The first mathematical model may output the first output value as a first pressure drop across the metering valve, and the second mathematical model may output the second output value as a second pressure drop across the gas cooling device.

In another example, a system is provided that may include a first virtual sensor representative of operation of a first portion of a tangible system. The first virtual sensor may receive one or more first measured characteristics of the tangible system and may output a first output value representative of operation of a common component of the tangible system based on the one or more first measured characteristics. The system may include a second virtual sensor representative of operation of a second portion of the tangible system. The second virtual sensor may receive one or more second measured characteristics of the tangible system and may output a second output value representative of operation of the common component of the tangible system based on the one or more second measured characteristics. The common component of the tangible system may be included in both the first and second portions of the tangible system. The system also may include a controller that may receive the first output value from the first virtual sensor and the second output value from the second virtual sensor. The controller may determine a state of the common component by comparing the first output value with the second output value.

The controller may change operation of the first portion of the tangible system, the second portion of the tangible system, and/or the common component based on the state of the common component that is determined. The first virtual sensor may represent a first mathematical model of operation of the first portion of the tangible system, the second virtual sensor may represent a second mathematical model of operation of the second portion of the tangible system, and each of the first mathematical model and the second mathematical model may have a variable that is independent of another of the second mathematical model or the first mathematical model.

The controller may determine the state of the common component as an undesirable state responsive to a ratio of the first output value and the second output value exceeding a designated threshold. The controller may determine the state of the common component as a desirable state responsive to the ratio of the first output value and the second output value not exceeding the designated threshold. The first virtual sensor may determine a first pressure drop across the first portion of the tangible system, and the second virtual sensor may determine a second pressure drop across the second portion of the tangible system. The first virtual sensor may output the first output value as a first modeled value of a pressure at the common component of the tangible system. The second virtual sensor may output the second output value as a second modeled value of the pressure at the common component of the tangible system.

The tangible system may be an EGR system that includes a propulsion system of a vehicle, the first portion of the tangible system may include an exhaust gas valve, and the second portion of the tangible system may include a cooling apparatus of the vehicle. The first virtual sensor may output the first output value as a first pressure drop across the exhaust gas valve, and the second virtual sensor may output the second output value as a second pressure drop across the cooling apparatus. The controller may determine a state of the EGR system based on a ratio of the first output value and the second output value. The controller may calculate the first calculated value and the second calculated value as pressures. The exhaust gas valve may be a metering valve.

The controller may calculate each of the first calculated value and the second calculated value using plural mathematical models that differ from each other. The controller may change operation of the vehicle based at least in part on a determined state of the common component.

In another example, a system may include a first pressure sensor that may measure a first pressure upstream of a gas cooling apparatus in an EGR system of a vehicle, a position sensor that may detect a position of a valve that is upstream of the gas cooling apparatus, a second pressure sensor that may measure a second pressure downstream of the gas cooling apparatus, and a controller that may calculate a first calculated value based on a combination of the first pressure, the position of the valve, and a flow rate of exhaust through the valve. The controller may calculate a second calculated value based on the second pressure and an efficiency value of the gas cooling apparatus. The controller may determine a state of the EGR system by comparing the first calculated value and the second calculated value.

As used herein, an element or step recited in the singular and proceeded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following clauses, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

The above description is illustrative, and not restrictive. For example, the above-described embodiments (and/or aspects thereof) may be used in combination with each other. In addition, many modifications may be made to adapt a particular situation or material to the teachings of the subject matter without departing from its scope. While the dimensions and types of materials described herein define the parameters of the subject matter, they are exemplary embodiments. Other embodiments will be apparent to one of ordinary skill in the art upon reviewing the above description. The scope of the subject matter should, therefore, be determined with reference to the appended claims, along with the full scope of equivalents to which such clauses are entitled.

This written description uses examples to disclose several embodiments of the subject matter, including the best mode, and to enable one of ordinary skill in the art to practice the embodiments of subject matter, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

A reference herein to a patent document or any other matter identified as prior art, is not to be taken as an admission that the document or other matter was known or that the information it contains was part of the common general knowledge as at the priority date of any of the claims.

What is claimed is:

1. A method, comprising:
obtaining first and second mathematical models representative of operations of respective first and second portions of a tangible system, each of the first mathematical model and the second mathematical model configured to output a respective first or second output value representative of operation of a common component of the tangible system that is included in both the first and second portions of the tangible system, wherein a variable of the first mathematical model is independent from a variable of the second mathematical model;
inputting at least a first input value of at least a first measured characteristic of the first portion of the tangible system into the first mathematical model and at least a second input value of a second measured characteristic of the second portion of the tangible system into the second mathematical model;
obtaining the first output value from the first mathematical model based on the at least the first input value and the second output value from the second mathematical model based on the at least the second input value;
determining a state of the common component by comparing the first output value from the first mathematical model with the second output value from the second mathematical model; and changing operation of the common component based on the state of the common component that is determined.

2. The method of claim 1, further comprising changing operation of one or more of the first portion of the tangible system or the second portion of the tangible system based on the state of the common component that is determined.

3. The method of claim 1, wherein the first mathematical model represents a first pressure drop across the first portion of the tangible system, and the second mathematical model represents a second pressure drop across the second portion of the tangible system.

4. The method of claim 3, wherein the first mathematical model is configured to output the first output value as a first modeled value of a pressure at the common component of the tangible system, and the second mathematical model is configured to output the second output value as a second modeled value of the pressure at the common component of the tangible system.

5. The method of claim 1, wherein the tangible system includes a propulsion system of a vehicle, the first portion of the tangible system includes a metering valve, the second portion of the tangible system includes a gas cooling device of the vehicle, the first mathematical model is configured to output the first output value as a first pressure drop across the metering valve, and the second mathematical model is configured to output the second output value as a second pressure drop across the gas cooling device.

6. The method of claim 1, wherein comparing the first output value with the second output value comprises:
calculating a ratio of the first output value and the second output value;
responsive to the ratio of the first output value and the second output value exceeding a designated threshold, determining the state of the common component as a non-idealized state; and
responsive to the ratio of the first output value and the second output value not exceeding the designated threshold, determining the state of the common component as an idealized state.

7. A system, comprising:
a first virtual sensor representative of operation of a first portion of a tangible system, the first virtual sensor configured to receive one or more first measured characteristics of the tangible system and to output a first output value representative of operation of a common component of the tangible system based on the one or more first measured characteristics;
a second virtual sensor representative of operation of a second portion of the tangible system, the second virtual sensor configured to receive one or more second measured characteristics of the tangible system and to output a second output value representative of operation of the common component of the tangible system based on the one or more second measured characteristics, the common component of the tangible system included in both the first and second portions of the tangible system; and
a controller configured to receive the first output value from the first virtual sensor and the second output value from the second virtual sensor, the controller configured to determine a state of the common component by comparing the first output value with the second output value,
wherein the first virtual sensor represents a first mathematical model of operation of the first portion of the tangible system, the second virtual sensor represents a second mathematical model of operation of the second portion of the tangible system, and a variable of the first mathematical model is independent from a variable of the second mathematical model, and wherein the controller is further configured to change operation of the common component based on the state of the common component that is determined.

8. The system of claim 7, wherein the controller is further configured to change operation of one or more of the first portion of the tangible system or the second portion of the tangible system based on the state of the common component that is determined.

9. The system of claim 7, wherein the first virtual sensor is configured to determine a first pressure drop across the first portion of the tangible system, and the second virtual sensor is configured to determine a second pressure drop across the second portion of the tangible system.

10. The system of claim 9, wherein the first virtual sensor is configured to output the first output value as a first modeled value of a pressure at the common component of the tangible system, and the second virtual sensor is configured to output the second output value as a second modeled value of the pressure at the common component of the tangible system.

11. The system of claim 7, wherein the tangible system is an EGR system that includes a propulsion system of a vehicle, the first portion of the tangible system includes an exhaust gas valve, the second portion of the tangible system includes a cooling apparatus of the vehicle, and the first virtual sensor is configured to output the first output value as a first pressure drop across the exhaust gas valve, and the second virtual sensor is configured to output the second output value as a second pressure drop across the cooling apparatus.

12. The system of claim 11, wherein the controller is configured to determine a state of the EGR system based on a ratio of the first output value and the second output value.

13. The system of claim 12, wherein the controller is configured to calculate the first output value and the second output value as pressures.

14. The system of claim 11, wherein the exhaust gas valve is a metering valve.

15. The system of claim 11, wherein the controller is configured calculate each of the first output value and the second output value using plural mathematical models that differ from each other.

16. The system of claim 11, wherein the controller is configured to change operation of the vehicle based at least in part on a determined state of the common component.

17. The system of claim 7, wherein comparing the first output value with the second output value comprises:

calculating a ratio of the first output value and the second output value;

responsive to the ratio of the first output value and the second output value exceeding a designated threshold, determining the state of the common component as an undesirable state; and responsive to the ratio of the first output value and the second output value not exceeding the designated threshold, determining the state of the common component as a desirable state.

* * * * *